United States Patent [19]

Nedvidek

[11] Patent Number: 4,984,229
[45] Date of Patent: Jan. 8, 1991

[54] AUTOFOCUS SYSTEM
[75] Inventor: Francis J. Nedvidek, Midland, Canada
[73] Assignee: Polaroid Corporation, Cambridge, Mass.
[21] Appl. No.: 273,421
[22] Filed: Nov. 18, 1988
[51] Int. Cl.$^5$ .............................................. G11B 7/00
[52] U.S. Cl. ................................. 369/44.24; 369/121
[58] Field of Search ............... 369/44.11, 44.14, 44.23, 369/44.24, 110, 112, 13, 14, 121, 122

[56] References Cited
U.S. PATENT DOCUMENTS 4,873,678 10/1989 Nakamura et al. .................. 369/13
4,918,675 4/1990 Lee ....................................... 369/112

Primary Examiner—Donald McElheny, Jr.
Attorney, Agent, or Firm—Francis J. Caufield

[57] ABSTRACT

Autofocus apparatus for use in an optical system utilizing a recording medium formed from a birefringent medium and a radiation-sensitive medium. The autofocus apparatus automatically focuses radiation through the birefringent medium and substantially at the interface between the birefringent medium and the radiation-sensitive medium and includes a source of linearly polarized radiation, a quarter-wave plate to convert the linearly polarized radiation to circularly polarized radiation, and an actuator controlled lens for focusing the radiation onto the recording medium, whereby radiation reflected from the first surface of the birefringent medium and the interface between the birefringent medium and the radiation-sensitive medium passes back through the lens and quarter-wave plate and is deflected by a beamsplitter to a polarization detector. The polarization detector isolates polarization components which arise from reflection at the interface and the isolated polarization components impinge upon a detector. The detector provides a focus-error signal which is applied, in turn, to the actuator to maintain focus.

17 Claims, 3 Drawing Sheets

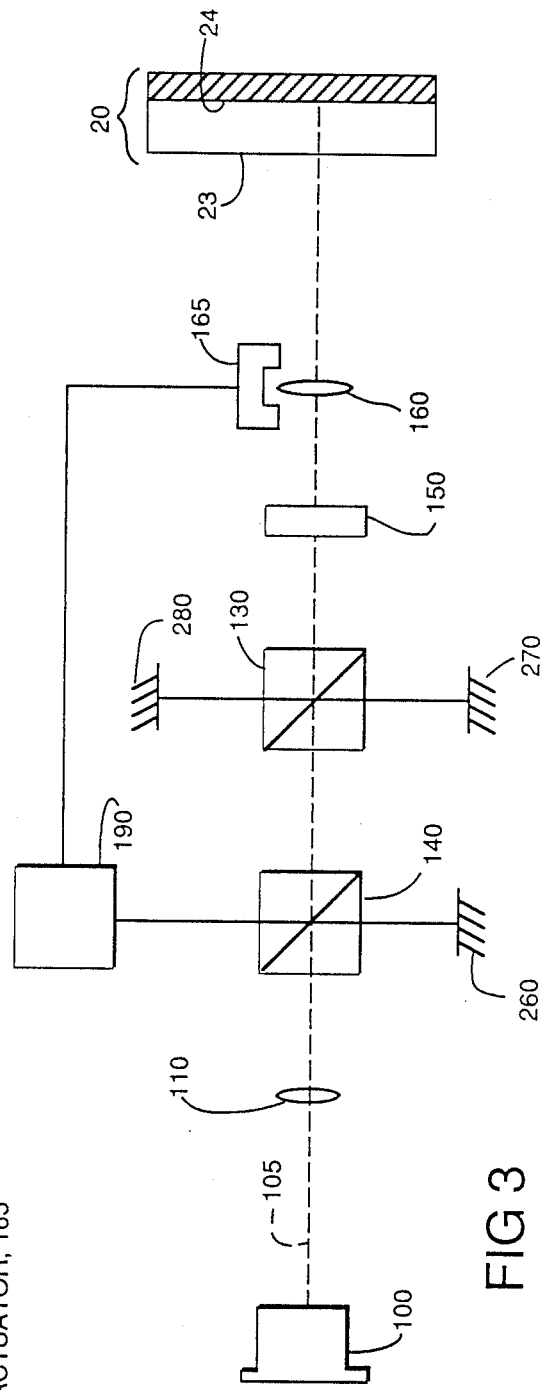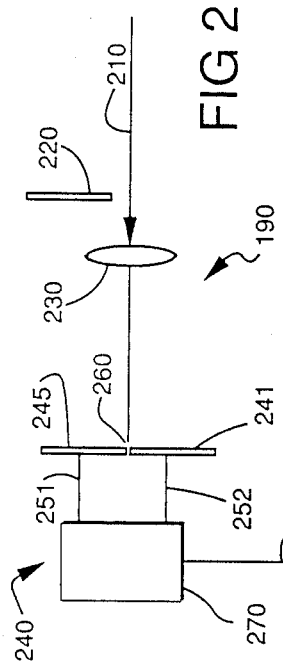

AUTOFOCUS SYSTEM

TECHNICAL FIELD OF THE INVENTION

The present invention, in general, pertains to an autofocus apparatus and, in particular, to an autofocus apparatus for use with a birefringent recording medium.

BACKGROUND OF THE INVENTION

Optical printing apparatus typically focus radiation from a source, such as a laser diode, onto a radiation-sensitive recording medium typically transported in a direction substantially transverse to the direction of propagation of the radiation. To provide reproducibile amounts of focused radiation per unit area on the recording medium, it has generally been found necessary to provide an autofocus apparatus that operates continuously throughout the printing process.

Because the need for autofocus apparatus is well recognized, there have been many attempts in the art to provide such apparatus in applications calling for reading, as well as, writing on a recording medium. Specifically, there have been many attempts to provide such autofocus apparatus for receiving radiation which has been reflected from the surface of the recording medium and isolating and analyzing that radiation apart from the radiation which is incident upon the surface of the recording medium. In particular, U.S. Pat. No. 4,542,492 issued on Sept. 17, 1985 discloses an autofocusing apparatus in FIG. 1 thereof wherein radiation emitted by a semiconductor laser is substantially linearly polarized along a given direction according to the junction plane of the laser. The radiation passes through a collimating lens and a polarization beam splitter. The polarization beam splitter is fabricated, for example, as a cube from two joined or bonded prisms and the separation or splitting surface provides a polarization splitting or separating function, i.e., it transmits radiation having the given direction of polarization and reflects radiation having a polarization direction oriented at 90° to the given direction. As a result, the radiation which emerges from the polarization beam splitter is substantially linearly polarized along the given direction.

Next, the radiation passes through a quarter-wave plate whose fast axis is oriented at 45° relative to the polarization of the incident beam and emerges as circularly polarized radiation. The circularly polarized radiation is focused by an objective lens onto the surface of the recording medium. Radiation is reflected from the recording medium, and it is also circularly polarized, but in the opposite sense from the radiation incident thereupon. The reflected radiation passes back through the objective lens and the quarter-wave plate and, as a result of traversing the quarter-wave plate, it is converted into linearly polarized radiation whose direction of polarization is oriented at 90° from the given direction. The reflected radiation then impinges on the polarization beam splitter and, because of the rotated polarization, is reflected to a photodetector means. The photodetector generates an error signal which is used to move the objective lens to maintain focus.

U.S. Pat. No. 4,654,519 issued on Mar. 31, 1987 discloses an autofocusing apparatus in FIG. 1 thereof which is similar to the one disclosed in U.S. Pat. 4,542,492 in that radiation emitted by a semiconductor laser source passes through a collimating lens, a polarization beam splitter, a quarter-wave plate after which it is focused by an objective lens onto the surface of the recording medium. The objective lens is supported, and can be moved along its optic axis to provide focusing, by means of a voice coil. Radiation reflected from the recording medium passes through the objective lens and the quarter-wave plate and, as a result of traversing the quarter-wave plate, it becomes linearly polarized with its direction of polarization being oriented at 90° to the direction of the original polarization. Next, the reflected radiation impinges upon the polarization beam splitter and, because of the rotated polarization, is reflected to a photodetector having a first and a second photosensitive region. A difference signal corresponding to the difference between the electric signals from the photosensitive regions is applied to a voice coil driver to alter the position of the objective lens to maintain optimum focus. Further, the patent discloses the use of a knife edge method, well known in the prior art, as one means for providing the difference signal.

U.S. Pat. No. 4,023,185 issued on May 10, 1977 discloses an autofocus apparatus in FIG. 3 thereof wherein radiation emitted by a laser source passes through a polarization beam splitter, a quarter-wave plate and is focused thereafter by an objective lens onto the surface of the recording medium. Radiation reflected from the recording medium passes through the objective lens and the quarter-wave plate and, as a result of traversing the quarter-wave plate, it becomes linearly polarized along a direction oriented at 90° to the direction of the original polarization. Next, the reflected radiation impinges on the polarization beam splitter and, because of the rotated polarization, is reflected to a photodetector means. The photodetector generates an error signal which is used to move the objective lens to maintain focus.

U.S. Pat. No. 4,358,200 issued on Nov. 9, 1982 discloses an autofocus apparatus in FIG. 3 thereof wherein a laser source emits a linearly polarized beam whose electric field vector is perpendicular to the plane of the drawing. The beam: (1) is reflected from the front surface of a plate, which front surface is a polarization sensitive splitting mirror; (2) passes through a quarter-wave plate; and (3) is focused thereafter by an objective lens onto the surface of the recording medium. Radiation reflected from the recording medium passes through the objective lens and the quarter-wave plate and, as a result of transversing the quarter-wave plate, its electric field vector is oriented parallel to the plane of the drawing, i.e., it is oriented at 90° to the direction of the original electric field vector. Next, the reflected radiation impinges on the front surface of the plate and passes therethrough because the electric field vector has been rotated by 90°. Finally, the radiation is reflected by the second surface of the plate to a photodetector. The photodetector generates an error signal which is used to move the objective lens to maintain focus.

Finally, U.S. Pat. No. 4,381,557 issued on Apr. 26, 1983 discloses an autofocusing apparatus in FIG. 1 thereof wherein a first laser source is used to read information stored on the recording medium and a second laser source, such as a semiconductor laser which emits coherent light at approximately 820 nm, is used to provide autofocusing. Radiation emitted by the first laser source passes through a beam telescope and a first beam splitter. Afterwards, the radiation is reflected by a dichroic reflector towards an objective lens which focuses the radiation onto the surface of the recording medium. Radiation reflected from the recording medium passes through the objective lens and is reflected by the dichroic mirror towards the first beam splitter which reflects the radiation, in turn, towards a light detector. Radiation emitted by the second laser source is focused onto a second beam splitter which transmits it towards the dichroic mirror. The radiation from the second laser source passes through the dichroic mirror and is focused by the objective lens to a fairly large spot on the surface of the recording medium. Radiation reflected from the large spot is: (1) collected by the objective lens; (2) transmitted by the dichroic mirror; and (3) reflected by the second beam splitter in a direction orthogonal to the direction of propagation of the radiation originally emitted from the second laser source to a detector.

The detector generates an error signal which is applied to a lens moving actuator for repositioning the objective lens to maintain focus for the radiation emitted by the first laser source.

As one can appreciate from the above, the above-discussed autofocus apparatus primarily rely on the fact that radiation reflected from the surface of the recording medium can be separated from radiation incident upon the recording medium by introducing some asymmetry in the optical path between the laser source and the surface of the recording medium. However, the disclosed autofocus apparatus further rely on the fact that there is only one source of reflected radiation, i.e., one surface of the recording medium. As a result, the disclosed apparatus are not suitable for use with a recording medium comprised, for example, of relatively thin layers of two different materials. This is because such a recording medium causes reflection of incident radiation from the front surface of the first material and from the back surface of the first material at the interface between the first and the second materials and the disclosed apparatus cannot separate and distinguish the radiaton reflected from these two surfaces. Thus, the disclosed autofocus apparatus cannot be used to focus on either the first or the second of these two surfaces.

In particular, consider the following specific example of a recording medium comprised of relatively thin layers of two different materials, i.e., a recording medium comprised of a thermally sensitive material such as carbon which is coated onto a transport material such as a 178 um thick Mylar sheet. In operation, radiation from, for example, a laser diode operating at a wavelength substantially at 820 nm, passes through the Mylar sheet and is focused on the interface between the Mylar and the carbon backing. A portion of the radiation is absorbed in the carbon backing and the heat generated thereby causes the carbon to bond to the Mylar. Because of the composition of the recording medium, radiation is reflected from the surface of the carbon backing as well as from the front surface of the Mylar sheet.

In practice, the above-described problem is exacerbated by the fact that the reflectivity of the Mylar sheet is several times larger than the reflectivity of the carbon. For example, in practice, the optical signal reflected from the Mylar sheet is approximately five times larger than that reflected from the Mylar-carbon interface located at the back, second surface of the 178 micrometer thick Mylar sheet. This causes a substantial problem because laser radiation must be focused at the surface of a material, namely, carbon, which reflects a signal which is approximately one-fifth as large as the unwanted signal reflected by the other material, namely, Mylar. Further, because the Mylar sheet sheet is so thin, the desired focus error signal due to the second surface, i.e., the Mylar carbon interface, is normally superimposed upon the undesired focus error signal due to the first surface, i.e., the air Mylar interface, and, as a result, the desired focus error signal is swamped by the undesired signal. Thus, acquisition and tracking of the second surface is not practicable with the above-described autofocusing apparatus disclosed in the prior art. In addition to the above, another fact that must also be considered is that the transport medium used in this particular application, namely, Mylar, is birefringent.

In light of the above, there is a need in the art for an autofocus apparatus for use with a recording medium comprised of a radiation sensitive medium affixed to a birefringent transport medium wherein radiation from a light source is focused through the birefringent transport medium and onto the interface between the birefringent transport medium and the radiation sensitive medium.

SUMMARY OF THE INVENTION

Embodiments of autofocusing apparatus fabricated in accordance with the present invention are used in an optical system which utilizes a recording medium comprising a birefringent transport medium and a radiation sensitive medium. Specifically, the inventive autofocus apparatus automatically focuses radiation through the birefringent transport medium and substantially at the interface between the birefringent transport medium and the radiation sensitive medium. More specifically, the inventive autofocus apparatus provides a focusing signal which is sensitive to the position of the interface between the birefringent transport medium and the radiation sensitive medium by selectively detecting light reflected from the interface between the birefringent transport medium and the radiationDsensitive medium and by rejecting light reflected from the birefringent transport medium.

The inventive autofocus apparatus comprises means for producing radiation having a known polarization which can be converted to a linear polarization by optical means disposed within the optical path of the focus system and means for focusing this radiation onto the recording medium. Convergent rays of such radiation enter the birefringent medium from different exit pupil diameters and traverse differing optical path lengths within the birefringent medium. The dissimilar refractive indicies of perpendicular and parallel polarization components introduce phase retardations in the rays which increase with the angle of the convergent beam. As a result, radiation exiting the birefringent medium after reflection from the interface between the birefringent medium and the radiation sensitive medium, contains an ensemble of rays of various polarization ellipticities. However, no phase retardation is experienced by radiation reflected from the first surface of the birefringent medium.

When the radiation reflected from the recording medium is passed through optical means which converts radiation having a known polarization to linearly polarized radiation, radiation reflected from the interface between the birefringement medium and the radiation sensitive medium will contain a polarization component which is perpendicular to that of the radiation reflected from the first surface of the birefringent medium. The radiation containing the perpendicular polarization component is isolated and used to provide the autofocus function by embodiments of the inventive autofocusing apparatus which further comprise: means for isolating the perpendicular components; means for generating a focus error signal for detecting when the radiation has been focused substantially at the interface between the birefringent medium and the radiation sensitive medium; and means for altering the focus of the focusing means in response to the focus error signal.

More specifically, the inventive autofocus apparatus comprises a source of linearly polarized light, for example, a laser diode which emits radiation that is substantially linearly polarized. The laser radiation impinges upon a polarization beam splitter and emerges from it linearly polarized. Further, the linearly polarized radiation passes through a beam splitter and a means for providing substantially circularly polarized light in response to the linearly polarized light, for example, a quarter-wave plate. The circularly polarized radiation is focused onto the recording medium by a focusing means, for example, an objective lens system whose distance from the recording medium is controlled by an actuator. Radiation reflected from the recording medium passes through the lens and the quarter-wave plate. The radiation which was reflected from the first surface of the birefringent medium emerges linearly polarized in a direction which is oriented at 90° from the original direction of linear polarization, and the radiation which was reflected from the interface between the birefringent medium and the radiation sensitive medium emerges with one component of polarization perpendicular to the original direction and with another component of polarization parallel to the original direction.

Then, the reflected radiation is deflected by the beam splitter and impinges on a means for rejecting a predetermined component of polarization, for example, a polarization beam splitter which separates the perpendicular and parallel components of polarization. The parallel component of polarization, which arises from reflection at the interface between the birefringent medium and the radiation sensitive medium, is directed to a photodetector for providing a focus error signal. The focus error signal is applied to the actuator to maintain proper focus.

In further embodiments of the present invention, the means for generating a focus error signal comprises a knife edge disposed in front of a lens which is focused on a first and second photodetector. The output signals from the photodetectors are subtracted to provide a focus error signal which has a substantially zero value when proper focus has been achieved.

In a further embodiment of the present invention, the positions of the beam splitter and the polarization beam splitter are juxtaposed so that the beam splitter is disposed in front of the polarization beam splitter instead of behind it as described above, and the second polarization beam splitter is removed. In such embodiments, the one polarization beam splitter: (1) provides linearly polarized radiation when radiation from the laser diode passes through on its way towards the recording medium and (2) rejects polarization components in the reflected radiation which are perpendicular to the original direction of linear polarization so that only radiation which has been reflected from the interface between the birefringent medium and the radiation-sensitive medium is passed to the beam splitter for deflection to the detector.

Still further embodiments of the present invention comprise placement of a dichroic beam splitter in the optical path so that one may utilize a light source which is dedicated to the focusing function and a light source which is dedicated to the reading or writing function.

BRIEF DESCRIPTION OF THE DRAWING

The present invention may be understood by considering the following detailed description together with the accompanying drawings, in which:

FIG. 2 shows a block diagram of a detector used in embodiments of the inventive autofocus apparatus;

FIG. 3 shows a block diagram of an alternative embodiment of the inventive autofocus apparatus.

To facilitate understanding, identical reference numerals are used to designate elements which commonly appear in the figures.

DETAILED DESCRIPTION

Figure 1:
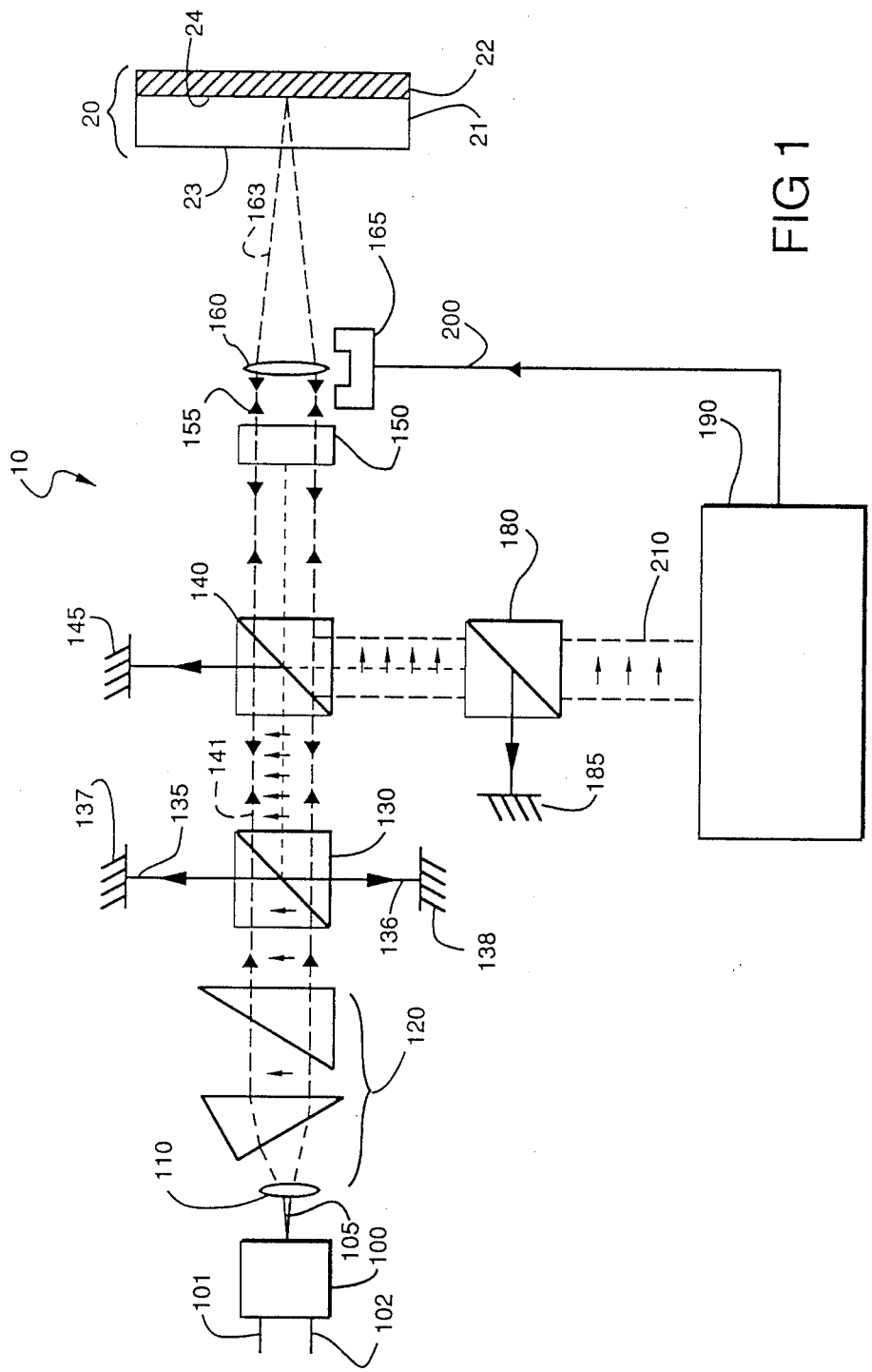
FIG. 1 shows a block diagram of an embodiment of the inventive autofocus apparatus.

FIG. 1 shows a block diagram of preferred embodiment 10 of the inventive autofocus apparatus. Recording medium 20 comprises 0.007 inch, i.e., ₹8 micrometer, thick transport sheet 21 of ethylene terephtalate which is commercially known as Mylar (a trademark of DuPont). Mylar is highly birefringent in the near infrared and has a refractive index which is substantially equal to 1.58 in the range of wavelengths between 750 nm and 850 nm. Affixed to sheet 21 is a thermally sensitive carbon layer 22. Due to the value of the index of refraction of the Mylar, the theoretical reflectivity from the air-Mylar interface at surface 23 at normal incidence is approximately 5%. Further, the theoretical reflectivity of the Mylar-carbon interface at surface 24 is approximately 1%. Experimental studies confirm the reasonableness of these theoretical estimates.

One can readily appreciate from this that the magnitude of the intensity of radiation reflected from front surface 23 of Mylar sheet 21 is large when compared with the intensity of radiation reflected from back surface 24. Nevertheless, as will be described below, the embodiment shown in FIG. 1 discriminates between the two reflected intensities to a sufficient extent that a reasonable signal-to-noise ratio is achieved for a backDsurface, focus-error signal.

Referring to FIG. 1, laser diode 100 is operated at a nominal wavelength of 780 nm and with a peak output power of approximately 15mW. Leads 101 and 102 provide electrical input to the diode from a power source (not shown) and electrical output from the diode to a current monitor (not shown), respectively. The junction of laser diode 100 is aligned so that the long dimension of the junction is disposed in the plane of the paper. As a result, laser diode 100 emits an elliptically shaped beam of radiation 105 whose major plane of polarization is in the plane of the paper.

Beam 105 is collimated by a lens 110 with an N.A. of 0.4 and is transformed by anamorphic prism beam expander 120 into a beam having a substantially circular cross section. Although the present invention does not require the radiation to have a circular cross section, it is advantageous for this to occur in order to provide substantially uniform intensity across the spot incident on recording medium 20. Further, anamorphic optical systems other than anamorphic prism system 120 are well known to those of ordinary skill in the art and may be used to increase the effective aperture of the optical scanning system and, hence, to increase the speed of the system.

The radiation that emerges from anamorphic prism beam expander 120 impinges upon polarization beam splitter 130. Polarization beam splitter 130 rejects radiation from beam 105 not linearly polarized in the plane of FIG. 1, i.e., beam 135 comprises radiation which has polarization components perpendicular to the plane of the paper and beam 135 is directed to radiation absorber 137. Further, as will be described below, polarization beam splitter 130 also acts as a 45° mirror to direct radiation reflected from recording medium 20 and polarized perpendicular to the plane of the paper into beam 136 and, as a result, into radiation absorber 138.

Radiation emerges from polarization beam splitter 130 as a beam 141 that is linearly polarized in the plane of the paper and impinges upon mirrored cube 140 which acts as a beamsplitter, for example, a 50/50 metallic beamsplitter. Mirrored cube 140 discards half of the laser beam output power to infrared absorbent baffle 145 and allows the remaining portion of the beam to pass to quarter-wave plate 150. Quarter-wave plate 150 is aligned so that the radiation emerges therefrom as a beam 155 that is substantially circularly polarized. Circularly polarized beam 155 after emerging from quarter-wave plate 150 is focused by an objective lens 160 onto recording medium 20. Objective lens 160 is mounted on microprocessor controlled stage 165 which can be moved along the optic axis of objective lens 160 either towards or away from recording medium 20, the direction of movement being defined as being positive when stage 165 and, thereby lens 160, is moved towards recording medium 20 and negative when stage 165 is moved away from recording medium 20 and towards laser diode 100.

Some of the radiation content of beam 163 impinging upon recording medium 20 is reflected from surface 23 of Mylar sheet 21, and the rest of it passes through birefringent Mylar sheet 21. Some of the radiation which passes through Mylar sheet 21 is reflected from surface 24 and passes back through Mylar sheet 21, but in the opposite direction from the incident radiation, and the remainder of the radiation enters carbon layer 22 where it is mostly absorbed. Because Mylar sheet 21 is highly birefringent, optical power reflected from the rear or second surface 24 of Mylar sheet 21 experiences unequal phase retardations for the parallel and perpendicular electric field vibration directions. Because the relative phase between polarization components propagating in a medium is a function of the optical path traveled, rays from different pupil diameters of convergent incident beam 163 traverse differing optical paths within sheet 21 and, therefore, exhibit a multiplicity of relative phase retardations. The net effect near focus of lens 160 is to redistribute energy from the polarization state of incident beam 163 so that this radiation becomes pseudodepolarized. Further, as will be described in detail below, the signal derived from this radiaiton is analyzed and used to detect the condition of focus at second surface 24.

Radiation reflected from surface 23 and from surface 24 of recording medium 20 passes back through objective lens 160 and quarter-wave plate 150 along the optical axis of incident beam 163. As a result of crossing quarter-wave plate 150, the portion of the radiation which was reflected from first surface 23 becomes linearly polarized in a direction perpendicular to the direction of polarization of beam 141 and of the substantial polarization component of original laser beam 105, i.e., perpendicular to the plane of the paper. However, the portion of the radiation which was reflected from second surface 24 emerges from quarter-wave plate 150 with a polarization component which is perpendicular to the direction of polarization of beam 141 and with a polarization component which is parallel to that direction.

The reflected radiation then impinges upon 50/50 beamsplitter 140 and half of this optical power is deflected towards a polarization prism 180, for example, a Glan-Thompson prism. Polarizing prism 180 routes the portion of the reflected radiation having a polarization component perpendicular to that of beam 141 to radiation an absorber 185, i.e., Glan-Thompson prism 180 is oriented to transmit only radiation components having a polarization parallel to that of beam 141. As a result, no radiation reflected from first surface 23 passes through and only radiation reflected from second surface 24 having the same polarization as beam 141 is transmitted by prism 180. Next, transmitted beam 210 which contains radiation reflected from second surface 24 impinges upon detector 190, which detector will be described in further detail below. Detector 190 generates a focus-error signal which is applied over lead 200 to objective lens actuator 165 to maintain focus.

FIG. 2 shows a preferred embodiment of detector 190 shown in FIG. 1. In particular, detector 190 comprises a knife-edge detection apparatus well-known in the art. As shown in FIG. 2, beam 210 impinges upon a detector which comprises knife-edge 220 placed in front of a lens 230. The radiation passing through this combination impinges upon photodetector 240 which comprises an upper portion 245 and a lower portion 246. Further, in accordance with methods well known in the art, a focus-error signal is formed by electronics 270 which produces the difference signal from the two portions of photodetector 240. The difference signal may be smoothed by dividing the difference signal by the sum of the signals from the two portions of photodetector 240 in a manner well known to those of ordinary skill in the art.

When second surface 24 of recording medium 20 is in focus, the power incident upon detector 240 is equally distributed so that detector half 245 situated geometrically behind knife-edge 220 receives the same incident power as detector half 246 situated directly behind the clear semi-pupil formed by knife-edge 220. When objective lens 160 is displaced longitudinally to either side of the best focus lens position, a greater portion of the reflected power from second surface 24 falls above or below detector median 260 to indicate a near focus or a far focus condition, respectively. Thus, balanced output signals over leads 251 and 252 from photodetectors 245 and 246, respectively, indicate the position for objective lens 160 which corresponds to best focus. Further, the focus-error signal produced by subtracting the signal from detectors 245 and 246 changes from its maximum negative to its maximum positive value over a distance of approximately four focal depths of the objective lens and does not drop to zero very rapidly. As a result, the knife-edge apparatus disclosed in FIG. 2 provides a true zero-crossing signal at best focus and is relatively insensitive to noise impulses and to large variations in optical signal power.

Although one particular embodiment for detector 190 was discussed above, this particular apparatus is not required in fabricating embodiments of the present invention and many other detectors known in the art may be used in its place.

The following considerations should be kept in mind when one is fabricating embodiments of the present invention. Optical surfaces, such as the sides of prisms, cause total internal reflection of a divergent beam. As a result, optical paths which are not properly stopped can cause parasitic zero crossings when the power of the internally reflected or convergent rays at the beam periphery approach the magnitude of the axial divergent portion of the beam. The ray bundles for each case fall upon opposite sections of the split detector and, when balanced, produce an erroneous zero crossing detection. However, careful design of the optical path and elimination of surfaces which tend to produce stray reflections in accordance with methods well known in the art can alleviate this problem. Normally, however, the extraneous zero crossings are far removed from the legitimate focus-error signal null and are of opposite slope. Such false zero crossings are therefore ignored by the position control electronics.

The physical displacement of objective lens 160 is accomplished by means of dual axis micropositioning actuator 165. Actuator 165 comprises two moving coil linear motion solenoids. The solenoids and lens mount are fabricated as a single assembly and suspended in a magnetic circuit. The suspension which supports the coils and objective lens 160 in the magnetic field plays an important role in tailoring the dynamic response of the actuator. Also, it is preferred to use magnets comprised of rare-earth materials because such magnets yield high energy product coefficients and, as a result, achieve large sensitivity and linear parameter values.

Finally, in order to decrease stray reflections and parasitic zero crossings, it is preferred to reduce the number of cemented interfaces, reduce the length of the return optical paths within the prisms, and to use aperture and field stops.

FIG. 3 shows a block diagram of an alternative embodiment of the inventive auto-focus apparatus wherein, in essence, 50/50 beamsplitter 140 is disposed in front of polarization beam splitter 130 rather than afterwards as is shown in FIG. 1. As described below, this juxtaposition of beamsplitter 140 and polarization beam splitter 130 enables one to eliminate polarization prism 180 shown in FIG. 1. In particular, as shown in FIG. 3, laser beam 105 emitted by laser diode 100 impinges upon 50/50 beam splitter 140 and approximately half of the radiation is deflected towards radiation absorber 260, and the other half passes through to impinge upon polarization beam splitter 130. The components in the beam perpendicular to the plane of the paper which impinge upon polarization beam splitter 130 are deflected to radiation absorber 270, and the radiation which emerges from beam splitter 130 is linearly polarized, the direction of its polarization being in the plane of the paper. The radiation output from polarization beam splitter 130, as described above with respect to FIG. 1, passes through quarter-wave 150 plate and is focused by objective lens 160 onto recording medium 20. Radiation reflected from first surface 23 and from second surface 24 passes back through objective lens 160 and quarter-wave plate 150 to reimpinge upon polarization beam splitter 130. As has been described previously, the radiation reflected from first surface 23 which impinges upon polarization beam splitter 130 is substantially linearly polarized radiation with its direction of polarization being perpendicular to the plane of the paper and, as a result, polarization beam splitter 130 deflects this radiation to radiation absorber 280. Further, the radiation reflected from second surface 24 which impinges upon polarization beam splitter 130 has two components of polarization. The first component of polarization is perpendicular to the plane of the paper and is deflected by polarization beam splitter 130 to radiation absorber 280. The second component of polarization is polarized in the plane of the paper and passes through beam splitter 130 and a portion thereof is deflected by 50/50 beam splitter 140 towards detector 190. The remainder of the apparatus shown in FIG. 3 operates in the same manner as has been described above with respect to the embodiment shown in FIG. 1.

The above-described embodiments of the inventive autofocus apparatus are typically used in an optical printing apparatus which is referred to in the art as a laser printer. As such, noise arising from changes in the reflectivity of the second surface during the write operation and the large signal swings due to transitions between write and idle optical power levels pose potential problems for the design of the electronic circuitry needed for optical signal detection and focus servo control. An alternative embodiment which circumvents these potential difficulties relies upon a focus laser which is dedicated to the focusing function. In this way, the effects on focus acquisition and tracking caused by variations in write beam spot shape with power and optical noise produced by the thermal reaction at the second surface are also neutralized.

Figure 4:
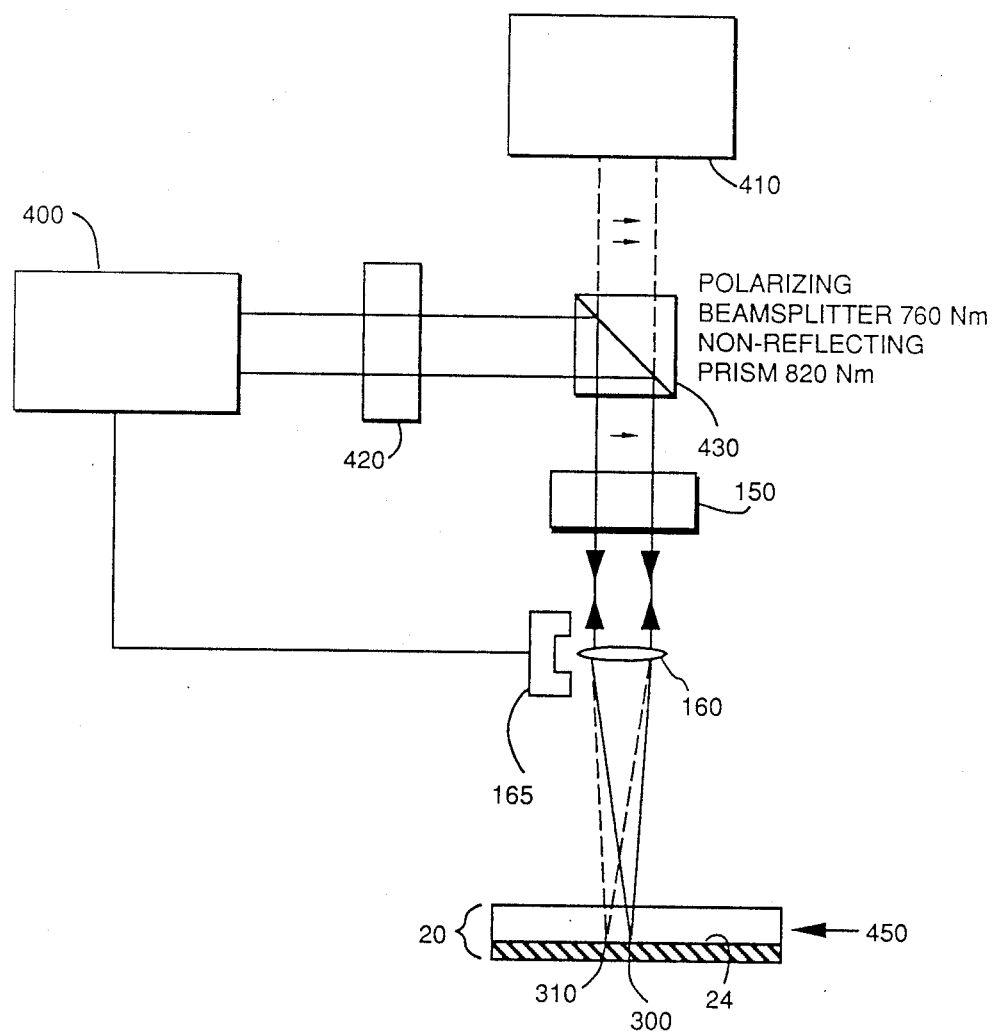
FIG. 4 shows a block diagram of an autofocus apparatus which utitlizes a dedicated focusDsensing laser which is separate from a writing laser.

FIG. 4 shows a block diagram of an embodiment of the present invention which utilizes a separate focus laser for focus sensing. As shown in FIG. 4, a focus laser and optical system for providing detection of focus are incorporated in block 400. In the particular arrangement shown, the focus laser contained in block 400 provides radiation substantially at 760 nm. An arrangement of write lasers is contained in block 410, and the radiation output therefrom has a wavelength substantially at 820 nm. Radiation from block 400 passes through a filter 420 and impinges upon a dichroic reflector 430. Further, radiation from block 410 also impinges upon dichroic reflector 430. In one embodiment, dichroic reflector 430 reflects 760 nm wavelength radiation emitted by the focus laser in block 400 and transmits 820 nm wavelength radiation emitted by the write laser arrangement in block 410. It is well known in the art as to how to fabricate an optical element having these properties. Further, as shown in FIG. 4, the radiation emerging from dichroic reflector 430 passes through quarter-wave plate 150 and is focused by objective lens 160 onto medium 20.

More specifically, objective lens 160 focuses radiation emitted by: (1) the focus laser in block 400 to spot 300 at second surface 24, and (2) the write laser arrangement in block 410 to spot 310 at second surface 24. Further, arrow 450 shows the direction of movement of recording medium 20. Thus, as a consequence of this movement and the point of focus of the two beams, spot 300 from the focus laser in block 400 falls ahead of spot 310 from the write laser arrangement in block 410 in the direction of relative motion of the optical head with respect to recording medium 20. Thus, the radiation reflected from recording medium 20 and used to provide the focus is always reflected from an unwritten section of second surface 24.

The radiation from the focus laser in block 400 which is reflected from recording medium 20 passes back through objective lens 160 and quarter-wave plate 150 and is reflected by dichroic reflector 430 back to block 400. Further, the remaining components in block 400 may be like those in FIG. 1 or like those shown in FIG. 3 for providing a focus-error signal to be applied to actuator 165.

A further advantage of the focus laser arrangement shown in FIG. 4 is that since the power of the focus laser in block 400 is independent of the write laser output, the focus laser can be modulated at a preselected rate without disturbing writing.

Clearly, those skilled in the art recognize that further embodiments of the present invention may be made without departing from its teachings. For example, dichroic reflector 430 in FIG. 4 may be a dichroic polarization beam splitter. In such an embodiment, the polarization of the radiation emitted by the focus and the write lasers may be rotated by 90° from each other in order to enhance the isolation of the write laser arrangement from reflections from recording medium 20. This may be done by, for example, properly aligning the junctions of laser diodes which provide the appropriate laser radiation. In such a case, for example, the remaining components in block 400 would be like those shown in FIG. 3 for providing a focus-error signal to be applied to actuator-165. Therefore, it is intended that all matter contained in the above description or shown in the accompanying drawings shall be interpreted as illustrative and not limiting.

What is claimed is:

1. Autofocus apparatus for use in an optical system which utilizes a recording medium comprised of a birefringent medium and a radiation-sensitive medium, said autofocus apparatus automatically focusing radiation through the birefringent medium and substantially at the interface between the birefringent medium and the radiation-sensitive medium, said autofocus apparatus comprising:
   means for providing radiation which is substantially linearly polarized along a first direction;
   transformation means, disposed in the path of said linearly polarized radiation, for converting said linear polarization to a predetermined polarization, which predetermined polarization can be rendered linearly polarized by transmission through the transformation means;
   focusing means, disposed in the path of the radiation having said predetermined polarization, for focusing said radiation onto the recording medium after which it is reflected from a first surface of the birefringent medium and from the interface between the birefringent medium and the radiation-sensitive medium and passes back through the focusing means and the transformation means;
   means for deflecting said reflected radiation returning from said recording medium;
   isolation means, disposed in the path of the deflected radiation, for isolating different components of polarization thereof;
   error means, disposed in the path of the isolated radiation having a component of polarization which is substantially parallel to the first direction, for providing a focus-error signal; and
   means for adjusting the focus of the focusing means in response to the focus-error signal.

2. The autofocus apparatus of claim 1 wherein the means for providing radiation comprises a laser diode source which emits radiation and a polarization beam splitter for receiving radiation emerging from said laser diode.

3. The autofocus apparatus of claim 2 wherein said transformation means comprises a quarter-wave plate.

4. The autofocus apparatus of claim 3 wherein said focusing means comprises a lens.

5. The autofocus apparatus of claim 4 wherein said deflection means comprises a beam splitter.

6. The autofocus apparatus of claim 5 wherein said isolation means comprises a polarization beam splitter.

7. The autofocus apparatus of claim 6 wherein said error means comprises a knife-edge, a lens system and a first and second photodetector.

8. Autofocus apparatus for use in an optical system which utilizes a recording medium comprised of a birefringent medium and a radiation-sensitive medium, said autofocus apparatus automatically focusing radiation through the birefringent medium and substantially at the interface between the birefringent medium and the radiation-sensitive medium, said autofocus apparatus comprising:
   means for providing radiation which is substantially linearly polarized along a first direction;
   deflection means, disposed in the path of said radiation, for deflecting a portion of radiation impinging thereon and for transmitting a portion of the radiation impinging thereon;
   isolation means, disposed in the path of the radiation transmitted by the deflection means for transmitting linearly polarized radiation, said isolation means transmitting a first component of polarization and deflecting another;
   transformation means, disposed in the path of the linearly polarized radiation, for converting the linear polarization to a predetermined polarization, which predetermined polarization can be rendered linearly polarized by transmission through said transformation means;
   focusing means, disposed in the path of the radiation having said predetermined polarization, for focusing said radiation onto the recording medium whereupon radiation is reflected from a first surface of the birefringent medium and is reflected from the interface between the birefringent medium and the radiation-sensitive medium, said reflected radiation passing through said focusing means and said transformation means and impinging upon said isolation means, said isolation means operating to transmit radiation having a component of polarization which is substantially parallel to said first direction, the transmitted radiation impinging upon and being deflected by said deflection means;
   error means, disposed in the path of the deflected radiation, for providing a focus-error signal; and
   means for adjusting the focus of the focusing means in response to the focus-error signal;

9. The autofocus apparatus of claim 8 wherein said means for providing radiation is a laser diode source.

10. The autofocus apparatus of claim 9 wherein said deflection means comprises a beam splitter.

11. The autofocus apparatus of claim 10 wherein said isolation means comprises a polarization beam splitter.

12. The autofocus apparatus of claim 11 wherein said transformation means comprises a quarter-wave plate.

13. The autofocus apparatus of claim 12 wherein said focusing means comprises a lens.

14. The autofocus apparatus of claim 13 wherein said error means comprises a knife-edge, a lens system and a first and second photodetector.

15. The autofocus apparatus of claim 8 which further comprises a dichroic deflecting means disposed in front of said transformation means.

16. The autofocus apparatus of claim 8 which further comprises a dichroic deflecting means disposed in front of said transformation means.

17. The autofocus apparatus of claim 16 wherein said dichroic deflecting means comprises a dichroic polarization beam splitter.

* * * * *